United States Patent
Semba et al.

(10) Patent No.: US 7,177,113 B1
(45) Date of Patent: Feb. 13, 2007

(54) MAGNETIC RECORDING DISK DRIVE WITH SWITCHABLE ROTATIONAL VIBRATION CANCELLATION

(75) Inventors: Tetsuo Semba, San Jose, CA (US); Matthew T. White, Mountain View, CA (US); Kevin I. Tzou, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/196,874

(22) Filed: Aug. 3, 2005

(51) Int. Cl.
*G11B 5/596* (2006.01)
(52) U.S. Cl. .................................. 360/77.07
(58) Field of Classification Search ............... None
See application file for complete search history.

(56) References Cited

U.S. PATENT DOCUMENTS

| | | | |
|---|---|---|---|
| 5,521,772 A | 5/1996 | Lee et al. | |
| 5,663,847 A | 9/1997 | Abramovitch | |
| 6,414,813 B2 | 7/2002 | Cvancara | |
| 6,496,320 B1 | 12/2002 | Liu | |
| 6,580,579 B1 | 6/2003 | Hsin et al. | |
| 6,710,966 B1 | 3/2004 | Codilian et al. | |
| 2003/0218822 A1* | 11/2003 | Sri-Jayantha et al. | 360/77.02 |
| 2003/0231423 A1* | 12/2003 | Semba et al. | 360/77.03 |

OTHER PUBLICATIONS

Abramovitch, "Rejecting Rotational Disturbances on Small Disk Drives using Rotational Accelerometers," Proc. of the 1996 IFAC World Cong, San Fran, CA, Jul. 1996, pp. 1-6.
Jinzenji et al., "Acceleration Feedforward Control Against Rotational Disturbance in Hard Disk Drives," IEEE Transactions on Magnetics, vol. 37, No. 2, Mar. 2001, pp. 888-893.
White et al., "Increased Disturbance Rejection in Magnetic Disk Drives by Accleration Feedforward Control," Proc of the 1996 IFAC World Cong, San Fran, CA, 1996, pp. 489-494.

* cited by examiner

*Primary Examiner*—Hoa T. Nguyen
*Assistant Examiner*—Mitchell Slavitt
(74) *Attorney, Agent, or Firm*—Thomas R. Berthold

(57) ABSTRACT

A magnetic recording disk drive with rotational vibration (RV) cancellation uses the position error signal (PES) and the signal from a RV sensor to determine when to enable and disable RV cancellation. An RV feedforward compensation signal to be summed with the VCM control signal is "switchable", meaning that it can be enabled or disabled by the disk drive servo control processor. The determination to enable or disable is made from a comparison of the PES with a threshold PES, which may be an estimate of the off-track position of the head calculated from the RV sensor signal. The estimated off-track is compared to the absolute value of the actual or measured PES. If the estimated off-track is smaller than the actual PES, then the state of the RV cancellation is switched, i.e., if it is enabled it is disabled and if it is disabled it is enabled.

12 Claims, 4 Drawing Sheets

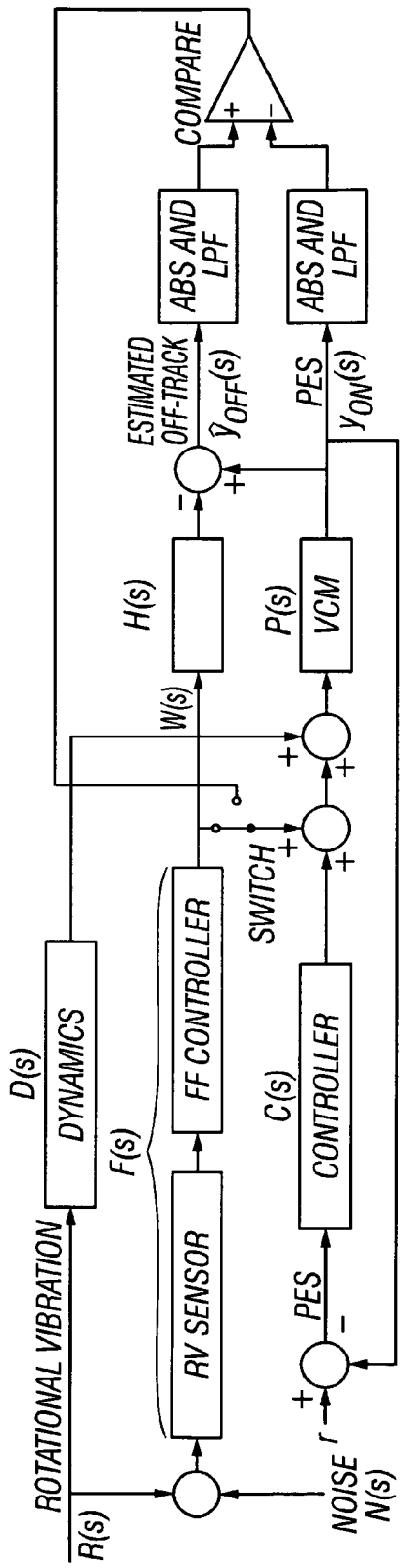
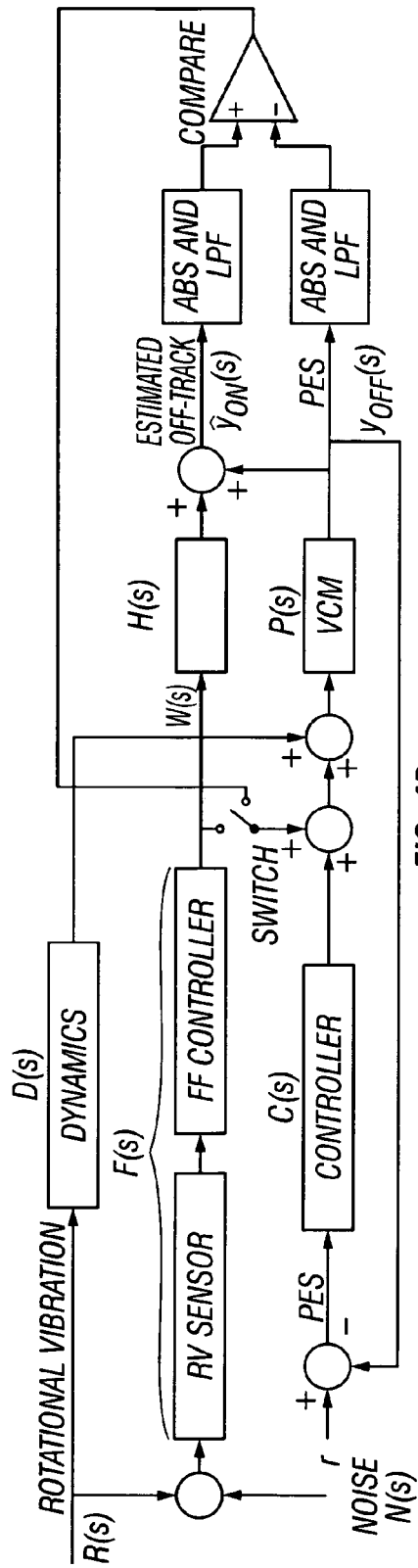
FIG. 4A
FIG. 4B

MAGNETIC RECORDING DISK DRIVE WITH SWITCHABLE ROTATIONAL VIBRATION CANCELLATION

BACKGROUND OF THE INVENTION

1. Field of the Invention

This invention relates generally to magnetic recording disk drives, and more particularly to a disk drive that includes a system for canceling the effects of rotational vibration.

2. Description of the Related Art

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

Disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system.

Rotational vibration (RV) cancellation is a method that uses sensors (typically accelerometers) to detect rotational vibration and improve the PES by canceling the off-track motion induced by the rotational vibration. The RV sensor signal is input to a feedforward controller that creates a feedforward compensation signal that is summed with the control signal to the VCM actuator. However, the conventional RV cancellation method may degrade the PES when the RV sensor output includes large amounts of noise which are not related to the rotational vibration. This problem becomes more critical as the track pitch becomes more narrow with the increasing data density of disk drives. Source of noise in the RV sensor output may be electrical or sensor-related. Examples of sensor-related noise include non-rotational vibrations detected by the sensor's cross-axis sensitivity, and/or spurious signals generated as a result of physical distortion of the sensor itself. When the rotational vibration is detected by a RV sensor made up of a pair of linear accelerometers, the gain mismatch of the accelerometers also creates an undesirable compensation signal that degrades the PES.

What is needed is a reliable method to switch the RV cancellation off when the sensor detects primarily non-rotational vibration or noise and to switch the RV cancellation on when the sensor is detecting primarily rotational vibration.

SUMMARY OF THE INVENTION

The invention is a disk drive with rotational vibration (RV) cancellation that uses the PES and the RV sensor signal to determine when to enable and disable RV cancellation. The RV feedforward compensation signal to be summed with the VCM control signal is "switchable", meaning that it can be enabled or disabled by the disk drive servo control processor. The determination to enable or disable is made from a comparison of the PES with a threshold PES. In one embodiment the RV sensor signal is also compared with a threshold RV signal. The servo control processor uses the results of the two comparisons and certain logic to determine whether to enable or disable the RV cancellation, i.e., to sum or not sum the feedforward compensation signal with the VCM control signal. The threshold PES and the threshold RV signal may be the known expected maximum values when the disk drive is not subject to any disturbance.

In a second embodiment the threshold PES is an estimate of how much the head would be off-track, with the RV sensor signal being used to calculate the estimated off-track. If the RV cancellation is already enabled, then the estimated off-track is the off-track estimated as if the RV cancellation was disabled. If the RV cancellation is already disabled, then the estimated off-track is the off-track estimated as if the RV cancellation was enabled. In either case, the RV sensor signal, which affects the feedforward compensation signal, is used to calculate the estimated off-track. In both cases the estimated off-track is compared to the actual or measured PES. If the estimated off-track is smaller than the actual PES, then the state of the RV cancellation is switched, i.e., if it is enabled it is disabled and if it is disabled it is enabled.

For a fuller understanding of the nature and advantages of the present invention, reference should be made to the following detailed description taken together with the accompanying figures.

BRIEF DESCRIPTION OF THE DRAWINGS

FIGS. 4A–4B are control system loops for a second embodiment of the invention wherein the threshold PES is an estimated off-track, with the RV sensor output being used to calculate the estimated off-track.

DETAILED DESCRIPTION OF THE INVENTION

Figure 1:
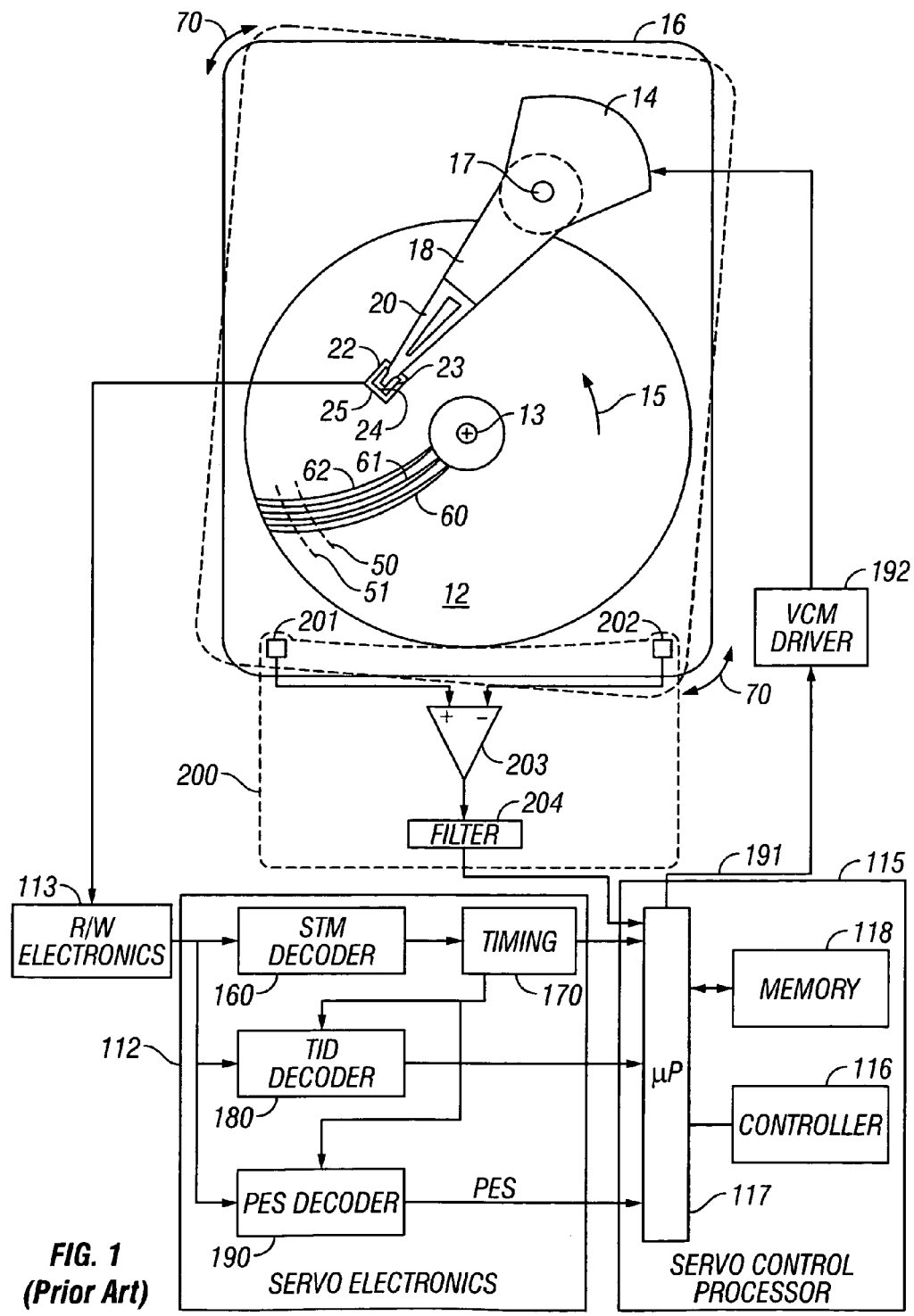
FIG. 1 is a schematic top view of a magnetic recording hard disk drive with a rotational vibration (RV) sensor and feedforward compensation according to the prior art.

FIG. 1 is a block diagram of a magnetic recording hard disk drive according to the prior art. The disk drive includes a magnetic recording disk 12 that is rotated about an axis of rotation 13 in direction 15 by a spindle motor (not shown) mounted to the disk drive housing or base 16. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM) that indicates the start of the servo sector, a track identification (TID) code, and a portion of a pattern of magnetized blocks or high-frequency bursts that are decoded to provide a head position error signal (PES).

The disk drive also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 113. The servo electronics 112 receives input from R/W electronics 113 and provides digital signals to servo control processor 115. The servo control processor 115 provides an output 191 to VCM driver 192 that controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 includes a microprocessor 117 that uses the PES as input to a control algorithm to generate the control signal 191 to VCM driver 192. The control algorithm recalls from memory 118 a "controller" 116, which is a set of parameters based on the static and dynamic characteristics of the "plant" being controlled, i.e., the VCM 14. The control algorithm is essentially a matrix multiplication algorithm, and the controller parameters are coefficients used in the multiplication and stored in memory accessible by the microprocessor 117.

The disk drive is subject to rotational disturbances, as shown by arrows 70, that arise both internally, such as from motion of the VCM 14, and externally, such as from shocks to the frame supporting the disk drive or from the movement of other disk drives when the drives are mounted together in a disk array system. These disturbances cause track misregistration (TMR) of the read/write heads. Thus it is known to incorporate into the disk drive a rotational vibration (RV) sensor 200 that detects rotational disturbances. RV sensor 200 is preferably a rotational accelerometer, shown as two linear accelerometers 201, 202, each attached to a respective side of base 16. The linear accelerometers 201, 202 are commercially available two-axis piezoelectric accelerometers, such as Murata Model PKGS-00LD accelerometers. The accelerometer is shown schematically as being attached directly to the base 16, but it may also be attached to a printed circuit board or card (not shown) that contains the disk drive electronics, which is secured to the base 16. The rotational accelerometer may also be a single-piece angular accelerometer. Other types of rotational accelerometers are commercially available from STMicroelectronics and Delphi.

The difference in output of the two linear accelerometers 201, 202 is summed at differential amplifier 203, so that together the linear accelerometers and the differential amplifier 203 function as a rotational accelerometer. The output of differential amplifier 203 is passed through a conditioning filter 204 and then to microprocessor 117. The servo control processor 115 uses the signal from RV sensor 200 to cancel the off-track motion induced by rotational vibration through a feedforward control method that creates a compensation signal that is used to provide the input 191 to the VCM driver 192. The feedforward controller is calculated by the microprocessor 117 using parameters and program instructions stored in memory 118. It is also well known in the art that the feedforward controller may be implemented with analog circuitry that converts the signal from the RV sensor to the compensation signal, with the compensation signal then being summed with the control signal to the VCM driver 192 after the servo control processor has calculated the control signal.

Figure 2:
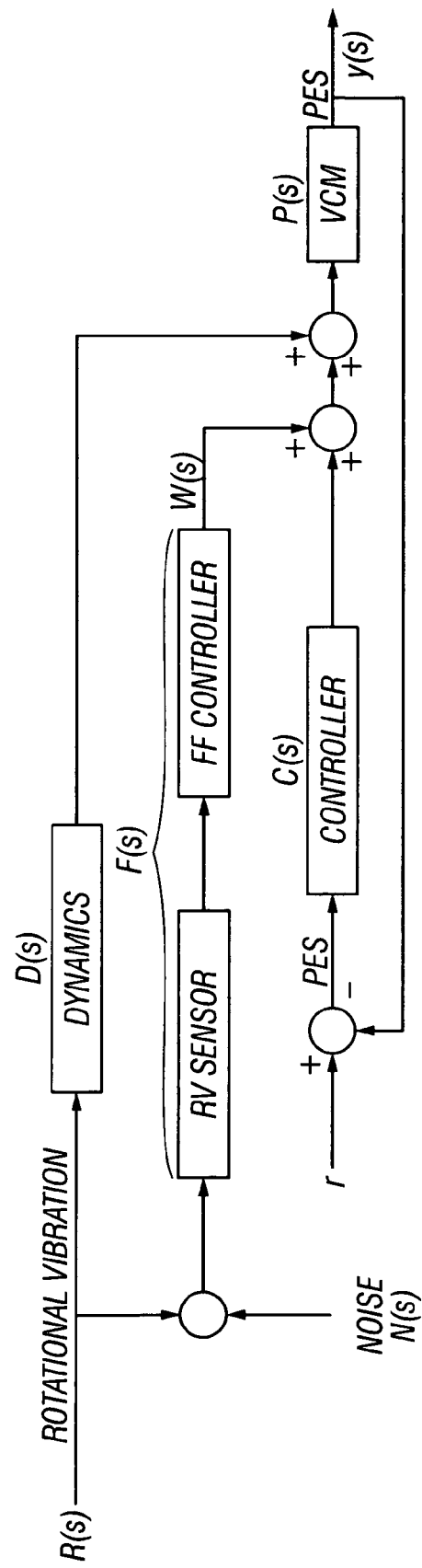
FIG. 2 is the control system loop for the prior art system of FIG. 1.

The control system loop is shown in FIG. 2. P(s) is the VCM actuator or "plant" transfer function, where s is the LaPlace transform variable. This transfer function is known from modeling (e.g., finite element modeling) during the disk drive design process, verified through standard frequency response measurement techniques during the disk drive testing process, and can be tested on each individual disk drive during manufacturing or recalibration operations. C(s) represents the VCM feedback controller transfer function, which is determined during the disk drive design process. It can also be verified through standard frequency response measurement techniques during testing process, and can also be tested on each individual disk drive during manufacturing or recalibration operations. The rotational vibration R(s) affects the disk drive dynamics D(s) and thus creates a disturbance added to the control signal to the VCM. However, the RV sensor detects the rotational vibration and the feedforward controller compensates for the disturbance by generating a compensation signal w(s) that is summed with the VCM control signal from the VCM controller. The feedforward controller may be implemented in analog circuitry or calculated by the servo control processor. F(s) represents the feedforward controller transfer function. Thus with the RV feedforward compensation the actual PES is given by:

$$y(s) = \frac{P(s)}{1 + P(s)C(s)}(D(s)R(s) + F(s)R(s)) \qquad \text{Equation (1)}$$

The use of a RV sensor and feedforward compensation in this manner is well-known, as described by Jinzenji et al., "Acceleration Feedforward Control Against Rotational Disturbance in Hard Disk Drives," *IEEE Transactions on Magnetics*, Vol. 37, No. 2, March 2001, pp. 888–893; and M. T. White et al., "Increased Disturbance Rejection in Magnetic Disk Drives by Acceleration Feedforward Control," *Proceedings of the 13th Triennial IFAC World Congress*, Jun. 30–Jul. 5, 1996, San Francisco, Calif., pp. 489–494.

As shown in FIG. 2, the RV sensor is also subject to noise input. When the RV sensor output includes a large amount of noise not related to the rotational vibration, the RV compensation may degrade the PES. Source of noise in the RV sensor output may be electrical or sensor-related. Examples of sensor-related noise include non-rotational vibrations detected by the sensor's cross-axis sensitivity, and/or spurious signals generated as a result of physical distortion of the sensor itself. In addition, when the RV sensor uses a pair of linear accelerometers, like 201, 202 in FIG. 1, the gain mismatch of the two accelerometers also creates an undesirable compensation signal and degrades the PES.

U.S. Pat. No. 5,663,847 describes a disk drive with a RV sensor and a feedforward controller whose gain is adapted to accommodate changes in RV sensor sensitivity, and a threshold detector for turning off the adaptive gain feature. U.S. Pat. No. 6,414,813 B2 describes a disk drive with a RV sensor and a feedforward controller with multiple sets of adjustable gains, where a gain set is selected if the RV sensor output and the PES exceed certain thresholds.

Figure 3:
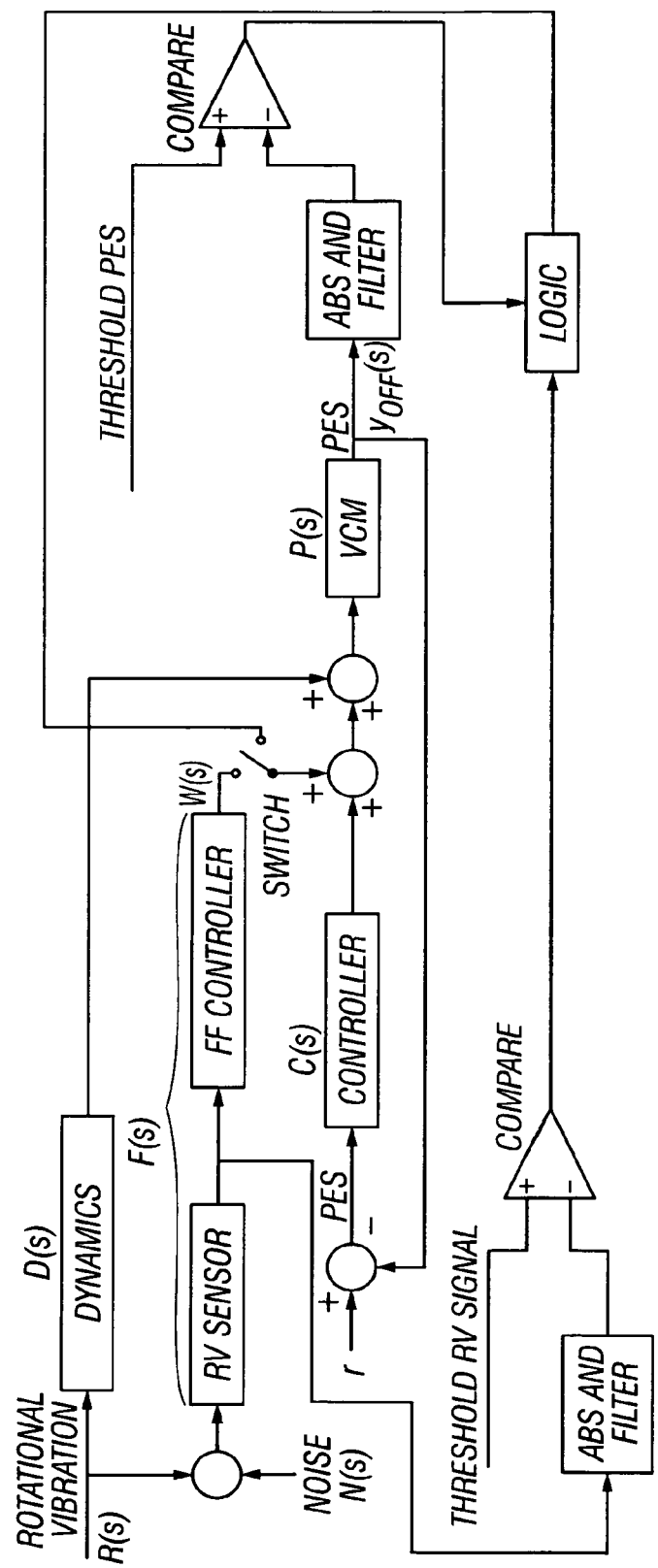
FIG. 3 is control system loop for a first embodiment of the invention that uses the position error signal (PES) and the RV sensor output to determine when to enable and disable the RV feedforward compensation.

In the present invention the PES and the RV sensor output are used to determine when to enable and disable the RV feedforward compensation. FIG. 3 is control system loop for a first embodiment of the invention. The compensation signal from the feedforward controller is "switchable", meaning that the servo control processor can enable or disable it. The determination to enable or disable is made from a comparison of the PES with a threshold PES. The RV sensor signal is also compared with a threshold RV signal. The servo control processor uses the results of the two comparisons and certain logic to determine whether to enable or disable the RV sensor, i.e., to sum or not sum the feedforward compensation signal w(s) with the VCM control signal. The threshold PES and the threshold RV signal may be the known expected maximum values when the disk drive is subject to minimal disturbance, such as in the manufacturing test environment. In one possible logic, if the RV sensor is enabled and both the PES and the RV sensor signal exceed their thresholds, then the RV sensor is disabled. This is based on the known likelihood that if the PES is out of its expected range at the same time that the RV sensor signal has a high output, then the disturbance is likely due to something other than pure rotational vibration.

As shown in FIG. 3 the absolute values (ABS) of the PES and RV sensor signal are used in the comparison. Also, either or both of the PES and the RV sensor signal may be filtered to remove resonances known to be unrelated to rotational disturbances. For example, bandpass or bandstop filters (with narrow passbands or stopbands) for either or both of the PES and the RV sensor signal may be appropriate for avoiding amplification of known resonances that cannot be effectively compensated using RV feedforward compensation. These resonances include printed-circuit-card vibration modes, which may be sensed by the RV sensor but do not contribute to the PES, or spindle-motor vibration modes, that do contribute to the PES but may not be effectively compensated using RV feedforward compensation. For example, in one specific disk drive the rotational disturbances typically occurred between about 100 and 1000 Hz. This disk drive was observed to have a resonant frequency around 500 Hz that was induced by a non-rotational disturbance along the Z axis (perpendicular to the disk surface). A bandstop filter at this frequency removes the contribution of this Z-axis disturbance from the RV sensor signal prior to its comparison with the threshold RV signal.

The use of an absolute value for the RV sensor signal and a positive threshold RV signal for the comparison in FIG. 3 simplifies the decision logic. It is of course possible to use positive and negative thresholds for the comparison, with the selection of which threshold to use depending on the sign of the RV sensor signal. It is also possible to compare the RV sensor signal with a threshold RV signal by use a statistical measurement, such as the root-mean-square (RMS) value of the RV sensor signal calculated over a specified number of samples, for the comparison with a threshold value.

FIGS. 4A–4B are control system loops illustrating a second embodiment of the invention wherein the threshold PES is an estimated off-track, with the RV sensor output being used to calculate the estimated off-track. If the RV compensation is enabled, as represented by the "switch" in FIG. 4A being closed, then the estimated off-track is an estimate of what the PES would be if the RV compensation was disabled. If the RV compensation is disabled, as represented by the "switch" in FIG. 4A being open, then the estimated off-track is an estimate of what the PES would be if the RV compensation was enabled. In either case, the RV sensor output, which affects the feedforward compensation signal w(s), is used to calculate the estimated off-track.

Referring first to FIG. 4A, when RV compensation is enabled, the measured or actual PES is given by the following equation.

$$y_{on}(s) = \frac{P(s)}{1+P(s)C(s)}(D(s)R(s) + F(s)R(s)) \quad \text{Equation (2)}$$

The estimated off-track when the RV compensation is disabled or off $[\hat{\gamma}_{off}(s)]$ is then calculated as follows:

$$\hat{y}_{off}(s) = \frac{P(s)}{1+P(s)C(s)}(D(s)R(s)$$
$$= y_{on}(s) - \frac{P(s)}{1+P(s)C(s)}F(s)R(s)$$
$$\approx y_{on}(s) - H(s) + w(s)$$
$$\text{where } H(s) \approx \frac{P(s)}{1+P(s)C(s)} \text{ and } w(s) = F(s)R(s).$$

Referring to FIG. 4B, when RV compensation is disabled, the measured or actual PES is given by the following equation.

$$y_{off}(s) = \frac{P(s)}{1+P(s)C(s)}D(s)R(s) \quad \text{Equation (3)}$$

The estimated off-track when the RV compensation is enabled or on $[\hat{\gamma}_{on}(s)]$ is then calculated as follows:

$$\hat{y}_{on}(s) = \frac{P(s)}{1+P(s)C(s)}(D(s)R(s) + F(s)R(s))$$
$$= y_{on}(s) + \frac{P(s)}{1+P(s)C(s)}F(s)R(s)$$
$$\approx y_{on}(s) + H(s) + w(s)$$
$$\text{where } H(s) \approx \frac{P(s)}{1+P(s)C(s)} \text{ and } w(s) = F(s)R(s).$$

In both examples (FIGS. 4A and 4B) the quantity [1/(1+P(s)C(s))] is known as the sensitivity function and also as the error rejection function. It is a standard measure of the disk drive feedback loop that is typically used during the disk drive design process. It may be calculated from the known transfer functions P(s) and C(s) or measured directly on the disk drive.

In both examples (FIGS. 4A and 4B) the filter H(s) is given by $$H(s)=P(s)/[1+P(s)C(s)].$$

H(s) may also be calculated from the known VCM, feedback controller, and sensitivity transfer functions, or measured directly on a disk drive. The general frequency response measurement techniques include inserting a small amplitude noise signal into the feedback loop and measuring the effects of the noise signal on various other places in the feedback loop. The input and output signal locations are determined by the desired frequency response to be measured. The input to the filter H(s) is the feedforward compensation signal w(s). The signal w(s) is available in digital (or analog) form on the disk drive electronics card. The output of the filter H(s) is compared to the measured PES to generate the estimated off-track.

When the RV compensation is enabled (FIG. 4A) the estimated off-track is an estimate of what the PES would be if RV compensation was disabled. When the RV compensation is disabled (FIG. 4B) the estimated off-track is an estimate of what the PES would be if RV compensation was enabled. In both examples (FIGS. 4A and 4B) the absolute value (ABS) of the estimated off-track is compared to the absolute values (ABS) of the actual PES. If the estimated off-track is smaller than the actual PES, then the state of the RV compensation is switched, i.e., if it is enabled it is disabled and if it is disabled it is enabled.

The use of an absolute value for the measured PES and a positive threshold PES for the comparison in FIG. 3, and the use of absolute values for the measured PES and estimated off-track in FIGS. 4A–4B simplifies the decision logic. It is of course possible to use positive and negative thresholds for the comparison, with the selection of which threshold to use depending on the sign of the measured PES. In either approach, the state of the RV compensation is switched if the value of the estimated off-track is smaller than the value of the threshold. It is also possible to compare the measured PES with a threshold PES by use a statistical measurement, such as the root-mean-square (RMS) value of the PES calculated over a specified number of samples, for the comparison with a threshold value.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a disk drive, the disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a rotational vibration (RV) sensor for sensing rotational vibration of the disk drive; (e) a servo control processor responsive to a position error signal (PES) from the servo positioning information for generating a VCM control signal, the PES representing the off-track position of the head; and (f) a feedforward controller responsive to a signal from the RV sensor for generating a compensation signal to be summed with the VCM control signal; the processor-implemented method comprising:

calculating an estimated off-track position of the head from the RV sensor signal, said calculated estimated off-track position of the head representing a PES threshold;

comparing the PES to said PES threshold to generate a PES comparison value, if the compensation signal is disabled, enabling the compensation signal in response to the comparison value; and if the compensation signal is enabled, disabling the compensation signal in response to the comparison value.

2. The method of claim 1 further comprising filtering the PES, and wherein comparing the PES to a PES threshold comprises comparing the filtered PES to a PES threshold.

3. The method of claim 1 further comprising:

comparing the RV sensor signal to a RV signal threshold; and if the compensation signal is enabled, disabling the compensation signal if the RV sensor signal exceeds the RV signal threshold and the PES exceeds the PES threshold.

4. The method of claim 3 further comprising filtering the RV sensor signal, and wherein comparing the RV sensor signal to a RV signal threshold comprises comparing the filtered RV sensor signal to a RV signal threshold.

5. The method of claim 4 wherein filtering the RV sensor signal comprises filtering the RV sensor signal at a frequency corresponding to a resonant frequency induced by a non-rotational disturbance to the disk drive.

6. The method of claim 1 wherein the feedforward controller is implemented in analog circuitry.

7. The method of claim 1 wherein the feedforward controller comprises a program of instructions readable by the processor.

8. A method for operating a disk drive, the disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a rotational vibration (RV) sensor for sensing rotational vibration of the disk drive; (e) a servo control processor responsive to a signal from the RV sensor and to a position error signal (PES) from the servo positioning information for generating a VCM control signal, the processor-implemented method comprising:

calculating from the RV sensor signal a compensation signal for summing with the VCM control signal;

estimating an off-track position of the head from the compensation signal;

if the value of the estimated off-track is less than the value of the measured PES and the compensation signal is not summed with the VCM control signal, enabling the summing of the compensation signal with the VCM control signal; and if the value of the estimated off-track is less than the value of the measured PES and the compensation signal is summed with the VCM control signal, disabling the summing of the compensation signal with the VCM control signal.

9. A magnetic recording disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a rotational vibration (RV) sensor for sensing rotational vibration of the disk drive; (e) a servo control processor; and (f) a program of instructions readable by the processor for undertaking method acts comprising:

receiving a RV sensor signal from the RV sensor and a position error signal (PES) from the servo positioning information;

calculating a VCM control signal from the PES;

calculating from the RV sensor signal a compensation signal;

summing the compensation signal with the VCM control signal;

comparing the PES to a PES threshold;

comparing the RV sensor signal to a RV signal threshold; and if the PES is greater than the PES threshold and the RV sensor signal is greater than the RV signal threshold, disabling the summing of the compensation signal with the VCM control signal.

10. The disk drive of claim 9 wherein the PES is filtered, and wherein comparing the PES to a PES threshold comprises comparing the filtered PES to a PES threshold.

11. The disk drive of claim 9 wherein the RV sensor signal is filtered at a frequency corresponding to a resonant frequency induced by a non-rotational disturbance to the disk drive, and wherein comparing the RV sensor signal to a RV signal threshold comprises comparing the filtered RV sensor signal to a RV signal threshold.

12. A magnetic recording disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a rotational vibration (RV) sensor for sensing rotational vibration of the disk drive; (e) a servo control processor; and (f) a program of instructions readable by the processor for undertaking method acts comprising:

receiving a RV sensor signal from the RV sensor and a measured position error signal (PES) from the servo positioning information;

calculating a VCM control signal from the measured PES;

calculating from the RV sensor signal a compensation signal for summing with the VCM control signal;

estimating an off-track position of the head from the compensation signal;

if the value of the estimated off-track is less than the value of the measured PES and the compensation signal is not summed with the VCM control signal, enabling the summing of the compensation signal with the VCM control signal; and if the value of the estimated off-track is less than the value of the measured PES and the compensation signal is summed with the VCM control signal, disabling the summing of the compensation signal with the VCM control signal.

* * * * *